(12) United States Patent
Park et al.

(10) Patent No.: US 8,413,005 B2
(45) Date of Patent: Apr. 2, 2013

(54) METHOD AND APPARATUS FOR RETRANSMISSION

(75) Inventors: Jisoo Park, Daejeon (KR); Namsuk Lee, Daejeon (KR); Sook Jin Lee, Daejeon (KR); Yong Seouk Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 343 days.

(21) Appl. No.: 12/915,078

(22) Filed: Oct. 29, 2010

(65) Prior Publication Data

US 2011/0107170 A1 May 5, 2011

(30) Foreign Application Priority Data

Nov. 2, 2009 (KR) ......................... 10-2009-0104755
Oct. 28, 2010 (KR) ......................... 10-2010-0106260

(51) Int. Cl.
*G06F 11/00* (2006.01)

(52) U.S. Cl. ...................................... 714/749; 714/748

(58) Field of Classification Search .................. 714/749, 714/748, 750, 751, 761, 762, 788
See application file for complete search history.

(56) References Cited

U.S. PATENT DOCUMENTS

| 2009/0181689 A1 | 7/2009 | Lee et al. |
| 2009/0276676 A1 | 11/2009 | Lee et al. |
| 2010/0074211 A1 | 3/2010 | Kim et al. |
| 2010/0199140 A1 | 8/2010 | Lee et al. |
| 2010/0211845 A1 | 8/2010 | Lee et al. |

FOREIGN PATENT DOCUMENTS

| KR | 10-2008-0030941 | 4/2008 |
| KR | 10-2009-0005467 | 1/2009 |
| KR | 10-2009-0078723 | 7/2009 |
| KR | 10-2009-0078724 | 7/2009 |
| KR | 10-2009-0078727 | 7/2009 |
| KR | 10-2009-0078731 | 7/2009 |
| KR | 10-2009-0078749 | 7/2009 |
| KR | 10-2009-0114802 | 11/2009 |

*Primary Examiner* — Dieu-Minh Le
(74) *Attorney, Agent, or Firm* — Staas & Halsey LLP

(57) ABSTRACT

Provided is a method in which a terminal conducts an operation for retransmission using a frame divided into downlink subframes and uplink subframes, the method including: receiving a data burst transmitted from a base station; determining a feedback frame offset based on the relationship between a range determined based on division information of the frame and a downlink subframe index in which the data burst has been transmitted; determining indices of a frame and uplink subframe for transmitting a feedback signal based on the frame offset; transmitting the feedback signal to the base station in the determined indices of the frame and uplink subframe; and if an NACK message is included in the feedback signal, receiving the data burst retransmitted from the base station.

19 Claims, 11 Drawing Sheets

METHOD AND APPARATUS FOR RETRANSMISSION

CROSS-REFERENCE TO RELATED APPLICATION

This application claims priority to and the benefit of Korean Patent Application No. 10-2009-0104755 and 10-2010-0106260 filed in the Korean Intellectual Property Office on Nov. 2, 2009 and Oct. 28, 2010 the entire contents of which are incorporated herein by reference.

BACKGROUND OF THE INVENTION (a) Field of the Invention

The present invention relates to a method and apparatus for retransmission.

(b) Description of the Related Art

Among retransmission schemes, a Hybrid Automatic Repeat Request (HARQ) scheme is a combined transmission scheme of a Forward Error Correction (FEC) and an Automatic Repeat Request (ARQ) scheme. The HARQ scheme can be classified into a synchronous HARQ scheme and an asynchronous HARQ scheme according to the transmission timing of a retransmission packet. The synchronous HARQ scheme is a scheme in which a retransmission packet for an initial transmission packet is transmitted at a predetermined timing, which is applicable to uplink HARQ retransmission. The asynchronous HARQ scheme is a scheme in which a scheduler of a base station determines a transmission timing of a retransmission packet, which is applicable to downlink HARQ retransmission. The HARQ scheme may be classified into an adaptive HARQ scheme and a non-adaptive HARQ scheme according to changes in the amount and position of resources to be allocated. The adaptive HARQ is a scheme in which the amount and position of resources to be allocated can be changed. The non-adaptive HARQ is a scheme in which the amount and position of resources to be allocated are fixed. A wireless communication system can achieve a high scheduling gain and the effect of high speed data transmission by properly combining the synchronous and asynchronous HARQ schemes and the adaptive and non-adaptive HARQ schemes and using low signaling overhead.

Regarding an HARQ operation in which a base station (BS) transmits a data burst in a downlink (DL), first of all, the base station transmits, to a terminal, control information including resource allocation information and an HARQ subpacket which is an encoded data burst. The control information may be included as an information element (IE) in a MAP. The MAP may be, for example, a Down Link Basic Assignment Advanced-MAP (DL B-A-A-MAP). The terminal having received the data burst decodes the data burst using the control information, and determines a transmission timing of a feedback signal and sends an ACK (positive acknowledgement) message or an NACK (negative acknowledgement) message to the base station.

Regarding an HARQ operation in which a terminal (mobile station MS) transmits a data burst in an uplink (UL), the terminal receives control information including resource allocation information from a base station, and encodes the data burst using the received control information. After that, the terminal transmits an HARQ subpacket which is the encoded data burst to the base station at a predetermined transmission timing. At this point, the control information may be included in a MAP. The MAP may be, for example, an Up Link Basic Assignment Advanced-MAP (UL B-A-A-MAP). Then, the base station decodes the received data burst, and sends an ACK message or NACK message, as a feedback signal, to the mobile station. If the terminal receives the NACK message, the mobile station retransmits the data burst at a predetermined transmission timing.

A transmission time unit used in an HARQ operation is a Transmission Time Interval (TTI). The TTI is the duration of the transmission of the physical layer for a packet encoded over a radio air interface. The TTI is expressed as an integer number of subframes. For example, 1 TTI equals to an amount of time corresponding to one subframe. A data burst may be transmitted in at least one subframe. In general, the number of subframes occupied by the data burst can be denoted by TTI. The transmission of the data burst in one subframe is referred to as 1 TTI transmission or default TTI transmission, and the transmission of the data burst on continuous subframes is referred to as long TTI transmission.

In this manner, the base station and the terminal determine a transmission timing according to a predetermined transmission timing determination method and perform their corresponding HARQ operation. Thus, even if there are enough resources, the corresponding HARQ operation has to be performed after waiting until a settled transmission timing is reached. Particularly, in a Time Division Duplexing (TDD) mode in which frames are partitioned into uplink and downlink subframes, the timing of completion of data transmission may be unnecessarily delayed depending on the method of determining a transmission timing.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a retransmission method for determining a transmission timing so as to complete a procedure associated with data transmission at an early timing.

One exemplary embodiment of the present invention provides a method in which a terminal conducts an operation for retransmission using a frame divided into downlink subframes and uplink subframes, the method including: receiving a data burst transmitted from a base station; determining a feedback frame offset according to the range of a downlink subframe index in which the data burst has been transmitted, from among ranges set based on division information of the frame; determining a transmission timing of a feedback signal based on the feedback frame offset; transmitting the feedback signal to the base station at the determined timing; and if an NACK message is included in the feedback signal, receiving the data burst retransmitted from the base station.

The determining of the feedback frame offset may include: obtaining a reference timing parameter calculated based on the size of the number of the divided downlink subframes and the number of the divided uplink subframes; obtaining the range of a downlink subframe index in which the data burst has been transmitted from among a first range where the downlink subframe index is less than the reference timing parameter, a second range where the downlink subframe index is greater than the reference timing parameter and less than the sum of the number of the uplink subframes and the reference timing parameter, and a third range where the downlink subframe index is greater than the sum of the number of the uplink subframes and the reference timing parameter and less than the number of the downlink subframes; if the downlink subframe index in which the data burst has been transmitted is in the first range or the second range, determining the feedback frame offset as 0; and if the downlink subframe index in which the data burst has been transmitted is in the third range, determining the feedback frame offset as 0 or 1 by comparing a value determined by transmission information of the data burst with the processing time required to process the data burst.

If the number of the downlink subframes is greater than or equal to the number of the uplink subframes, the reference timing parameter is determined as floor((D−U)/2), and if the number of the downlink subframes is less than the number of the uplink subframes, the reference timing parameter is determined as −ceil((U−D)/2), and D and U may denote the number of the downlink subframes and the number of the uplink subframes, respectively.

The transmission information of the data burst may include the downlink subframe index in which the data burst has been transmitted and the number of subframes occupied by the data burst.

The value determined by the transmission information of the data burst is determined as $D-m'-N_{TTI}+U-1$, and D may denote the number of the downlink subframes, U may denote the number of the uplink subframes, m' may denote the downlink subframe index in which the data burst has been transmitted, and $N_{TTI}$ may denote the number of subframes occupied by the data burst.

The determining of the transmission timing may include determining a frame index so that, if the feedback frame offset is 0, the feedback signal is transmitted in the same frame as the frame in which the data burst has been transmitted, and if the feedback frame offset is 1, the feedback signal is transmitted in a frame next to the frame in which the data burst has been transmitted.

The determining of the transmission timing may further include: if the feedback frame offset is 0, determining an uplink subframe index so that the feedback signal is transmitted in any one of the uplink subframes included in the determined frame index; and if the feedback frame offset is 1, determining an uplink subframe index so that the feedback signal is transmitted in the first uplink subframe included in the determined frame index.

The determining of the uplink subframe index when the feedback frame offset is 0 may include, if the downlink subframe index in which the data burst has been transmitted is in the first range, determining the uplink subframe index as 0, if the downlink subframe index in which the data burst has been transmitted is in the second range, determining the uplink subframe index as a difference value between the downlink subframe index in which the data burst has been transmitted and the reference timing parameter, and if the downlink subframe index in which the data burst has been transmitted is in the second range, determining the uplink subframe index as the last index of the uplink subframe.

Another exemplary embodiment of the present invention provides a method in which a terminal retransmits using a frame divided into downlink subframes and uplink subframes, the method including: receiving control information from a base station; determining a packet transmission frame offset according to the range of a downlink subframe index in which the control information has been transmitted, from among ranges set based on division information of the frame; determining a transmission timing of a data burst based on the packet transmission frame offset and transmitting the data burst to the base station; receiving a feedback signal for the transmitted data burst from the base station; and if an NACK message is included in the feedback signal, determining a retransmission timing of the data burst and retransmitting the same to the base station.

The determining of the packet transmission frame offset may include: obtaining a reference timing parameter calculated based on the size of the number of the divided downlink subframes and the number of the divided uplink subframes; obtaining the range of a downlink subframe index in which the control information has been transmitted from among a first range where the downlink subframe index is less than the reference timing parameter, a second range where the downlink subframe index is greater than the reference timing parameter and less than the sum of the number of the uplink subframes and the reference timing parameter, and a third range where the downlink subframe index is greater than the sum of the number of the uplink subframes and the reference timing parameter and less than the number of the downlink subframes; if the downlink subframe index in which the control information has been transmitted is in the first range or the second range, determining the packet transmission frame offset as 0; and if the downlink subframe index in which the control information has been transmitted is in the third range, determining the packet transmission frame offset as 0 or 1 based on a value determined by the time required to process the data burst.

The transmitting of the data burst may include: determining a frame index so that, if the packet transmission frame offset is 0, the feedback signal is transmitted in the same frame as the frame in which the control information has been transmitted, and if the packet transmission frame offset is 1, the feedback signal is transmitted in a frame next to the frame in which the control information has been transmitted; if the packet transmission frame offset is 0, determining an uplink subframe index so that the data burst is transmitted in any one of the uplink subframes included in the determined frame index; and if the packet transmission frame offset is 1, determining an uplink subframe index so that the data burst is transmitted in the first uplink subframe included in the determined frame index; and transmitting the data burst in the determined indices of the frame and uplink subframe.

The determining of the uplink subframe index when the packet transmission frame offset is 0 may include, if the downlink subframe index in which the control information has been transmitted is in the first range, determining the uplink subframe index as 0, if the downlink subframe index in which the control information has been transmitted is in the second range, determining the uplink subframe index as a difference value between the downlink subframe index in which the data burst has been transmitted and the reference timing parameter, and if the downlink subframe index in which the data burst has been transmitted is in the second range, determining the uplink subframe index as the last index of the uplink subframe.

The retransmitting to the base station may include: determining the index of the uplink subframe in which the data burst has been transmitted the base station as the uplink subframe index to be retransmitted; determining the frame index to be retransmitted by comparing a value determined by the downlink subframe index in which the control information has been transmitted and the uplink subframe index in which the data burst has been transmitted with the processing time required to process the data burst; and retransmitting the data burst in the determined indices of the frame and uplink subframe.

Still another exemplary embodiment of the present invention provides a method in which a terminal conducts an operation for retransmission using a frame divided into downlink subframes and uplink subframes, the method including: transmitting control information to a terminal; receiving a data burst transmitted according to the control information from the terminal; obtaining a reference timing parameter calculated based on the size of the number of the divided downlink subframes and the number of the divided uplink subframes; determining an index of a downlink subframe for transmitting a feedback signal based on an uplink subframe index in which the data burst has been transmitted; determining a frame index for transmitting the feedback signal based on a timing spaced apart by a feedback frame offset from the frame index in which the data burst has been transmitted; transmitting the feedback signal to the terminal in the determined indices of the frame and downlink subframe; and if an NACK message is included in the feedback signal, receiving the data burst retransmitted from the terminal.

In the determining of the index of the downlink subframe, the index of the downlink subframe may be determined as a difference value between the index of the uplink subframe in which the data burst has been transmitted and the reference timing parameter.

The feedback frame offset may be determined as 0 or 1 by comparing a value determined by the downlink subframe index in which the control information has been transmitted and the uplink subframe index in which the data burst has been transmitted with the processing time required to process the data burst.

The value determined by the downlink subframe index in which the control information has been transmitted and the uplink subframe index in which the data burst has been transmitted may be determined as $U-m'-N_{TTI}+l'$, and U may denote the number of the uplink subframes, m' may denote the uplink subframe index in which the data burst has been transmitted, $N_{TTI}$ may denote the number of subframes occupied by the data burst, and l' may denote the downlink subframe index in which the control information has been transmitted.

One exemplary embodiment of the present invention provide a retransmission apparatus, as a retransmitting device of a terminal, including: a receiver for receiving any one of control information, a first data burst, and a feedback signal for a second data burst transmitted to a base station; a transmitter for transmitting a third data burst according to the control information or a feedback signal for the received first data burst, or retransmitting the second data burst in response to the received feedback signal to the base station; and a transmission timing determiner for determining a transmission timing of the third data burst, a transmission timing of the feedback signal for the first data burst, and a retransmission timing of the second data burst, wherein, when transmitting the third data burst or the feedback signal in the next frame of the frame in which the control information or the first data burst has been transmitted, the transmission timing determiner determines to transmit the third data burst or the feedback signal in the first subframe included in the next frame.

The transmission timing determiner may determine indices of a frame and uplink subframe index to be transmitted by setting ranges based on division information of a frame divided into downlink subframes and uplink subframes, and determining a feedback frame offset or a packet transmission frame offset according to the range of the downlink subframe index in which the control information or the first data burst has been transmitted among the set ranges.

According to the exemplary embodiments of the present invention, sequential transmission can be realized without reversing the order of a procedure associated with data transmission.

DETAILED DESCRIPTION OF THE EMBODIMENTS

Figure 1:
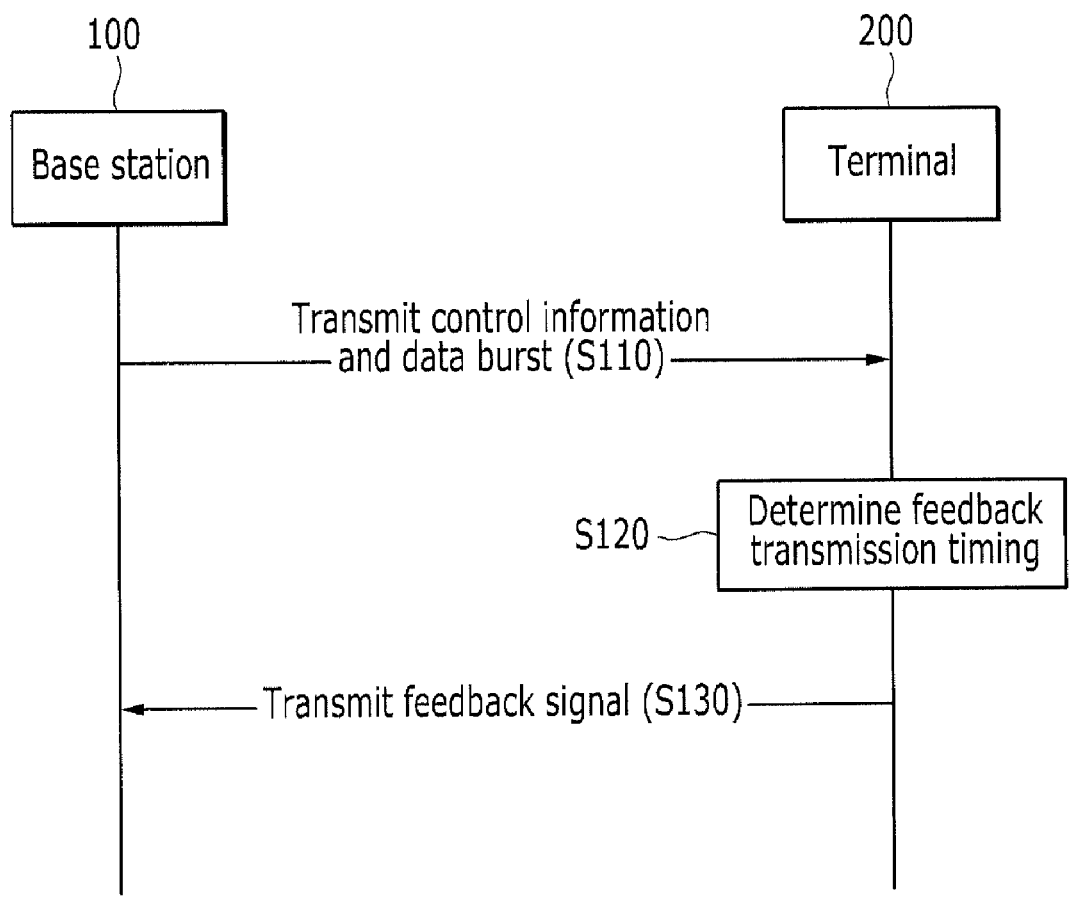
FIG. 1 is a flowchart schematically showing a downlink HARQ operation according to one exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In this specification, a terminal (UE) may designate a mobile station (MS), a mobile terminal (MT), a subscriber station (SS), a portable subscriber station (PSS), user equipment (UE), an access terminal (AT), etc., and may include the entire or partial functions of the mobile terminal, the subscriber station, the portable subscriber station, the user equipment, etc.

In this specification, a base station (BS) may designate an access point (AP), a radio access station (RAS), a Node B, an evolved node B (eNodeB), a base transceiver station (BTS), a mobile multihop relay (MMR)-BS, etc., and may include the entire or partial functions of the access point, the radio access station, the node B, the base transceiver station, the MMR-BS, etc.

Now, a retransmission method according to an exemplary embodiment of the present invention will be described in detail with reference to the accompanying drawings by taking an HARQ scheme as an example.

Figure 2:
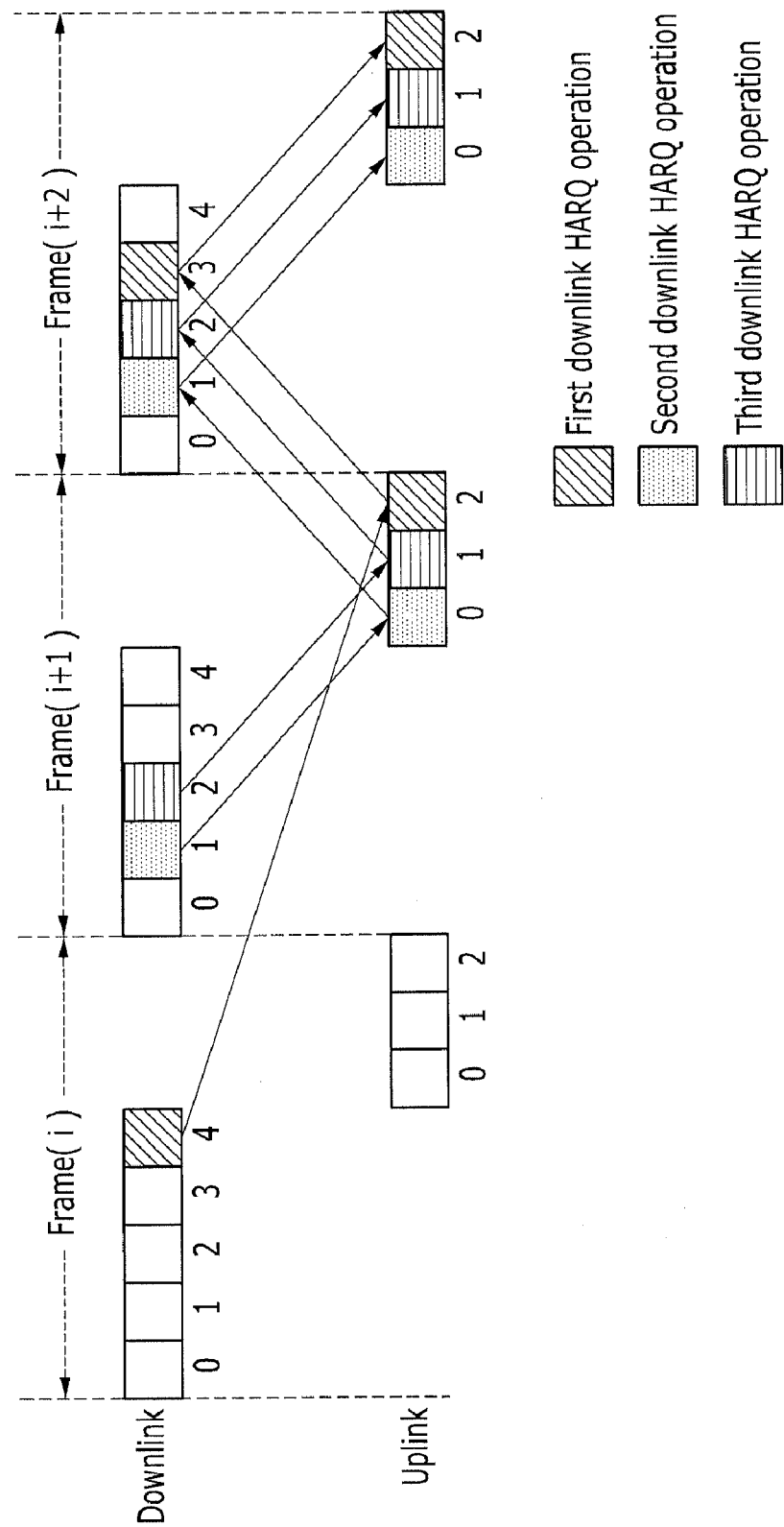
FIG. 2 is a view showing a downlink HARQ transmission timing according to one exemplary embodiment of the present invention.

FIG. 1 is a flowchart schematically showing a downlink HARQ operation according to one exemplary embodiment of the present invention. FIG. 2 is a view showing a downlink HARQ transmission timing according to one exemplary embodiment of the present invention.

First, referring to FIG. 1, a base station 100 transmits control information ad a data burst (S110). At this time, it is assumed that the control information and the data burst are transmitted using a downlink subframe with index 'm' (hereinafter, referred to as a subframe m) in a frame with index 'i' (hereinafter, referred to as a frame i). Frame indices may be indices 0 to N−1 given in the order of frames when N frames are included in a superframe. Downlink and uplink subframe indices may be indices given in order to the subframes allocated for downlink and uplink in a frame.

A terminal 200 having received the control information and the data burst determines indices j and n of a frame and unlink subframe for transmitting a feedback signal (S120). The index n of the uplink subframe for transmitting a feedback signal can be obtained by Equations 1 and 2. At this time, K is a reference timing parameter for determining a transmission timing (hereinafter, referred to as a reference timing parameter), and is determined based on the size of the number D of downlink subframes and the number U of uplink subframes constituting one frame, and obtained as in Equation 2.

$$n = \begin{cases} 0, & \text{for } 0 \le < K \\ m - K, & \text{for } K \le m < U + K \\ U - 1, & \text{for } U + K \le m < D \end{cases} \quad \text{(Equation 1)}$$

$$K = \begin{cases} \text{floor}((D - U)/2), & \text{for } D \ge U \\ -\text{ceil}((U - D)/2), & \text{for } D < U \end{cases} \quad \text{(Equation 2)}$$

In Equation 1 and Equation 2, the ceil function is a function for returning the closest integer greater than or equal to a corresponding value, and the floor function is a function for returning the closest integer greater than or equal to a corresponding value. D is the number of downlink subframes, and U is the number of uplink subframes. The index j of a frame for transmitting a feedback signal can be obtained by Equation 3 and Equation 4. At this time, z is a feedback frame offset used to determine a frame index for feedback transmission. If the feedback frame offset z is 0, a fast feedback procedure is performed in which a feedback signal is transmitted in the same frame as the frame i in which the data burst has been transmitted. If the feedback frame offset z is 1, a slow feedback procedure is performed in which a feedback signal is transmitted in the next frame i+1.

$$j = (i + z) \bmod N \quad \text{(Equation 3)}$$

$$z = \begin{cases} 0, & \text{if } (D - m - N_{TTI} + n) \ge T_{proc} \\ 1, & \text{else} \end{cases} \quad \text{(Equation 4)}$$

In Equation 3, the mod function is a function for performing a modular operation, and N is the number of frames included in the superframe. $N_{TTI}$ is a transmission time interval (TTI) value which denotes the number of subframes occupied by a data burst, and $T_{proc}$ is the processing time required to process the data burst which is expressed in units of subframes.

Next, the terminal 200 transmits, to the base station 100, a feedback signal including an ACK message or NACK message in the uplink subframe n of the frame j determined by using Equations 1 to 4 (S130). If the base station 200 receives an NACK message, the base station 200 can retransmit the data burst.

Referring to FIG. 2, the HARQ operation of a TDD mode is performed using a frame having subframes divided into downlink and uplink subframes at a given ratio. Hereinbelow, an HARQ operation is assumed in which one frame is divided into five downlink subframes (i.e., D=5) and three uplink subframes (i.e., U=3) and the processing time required to process the data burst corresponds to three subframes (i.e., $T_{proc}$=3).

Regarding the first downlink HARQ operation in which the base station 100 transmits control information and a data burst in a downlink subframe 4 of the frame i, the terminal 200 transmits a feedback signal in an uplink subframe 2 of the frame i+1 determined by using Equations 1 to 4. If the base station 100 receives an NACK message, the base station 100 can determine a retransmission timing in the asynchronous HARQ scheme. For example, the base station 100 can retransmit in a downlink subframe 3 of a frame i+2.

Next, when the base station 100 performs the second and third downlink HARQ operations for transmitting control information and a data burst in a downlink subframe 1 and a downlink subframe 2 of the frame i+1, respectively, the terminal 200 transmits a feedback signal in an uplink subframe 0 of the frame i+1 determined by using Equations 1 to 4 to perform the second HARQ downlink operation. If the base station 100 receives an NACK message, the base station 100 can retransmit in a downlink subframe 1 of the frame i+2. Likewise, the third downlink HARQ operation is performed by occupying an uplink subframe 1 of the frame i+1 and a downlink subframe 2 of the frame i+2.

In this case, there may occur a phenomenon that the terminal 200 transmits a feedback signal to an earlier received data burst to the base station 100 later than a feedback signal to a later received data burst. This is because the second and third downlink HARQ operations in which the feedback frame offset z used to determine the frame index is 0 performs a fast feedback procedure, while the first HARQ operation in which the feedback frame offset z is 1 performs a slow feedback procedure.

Figure 3:
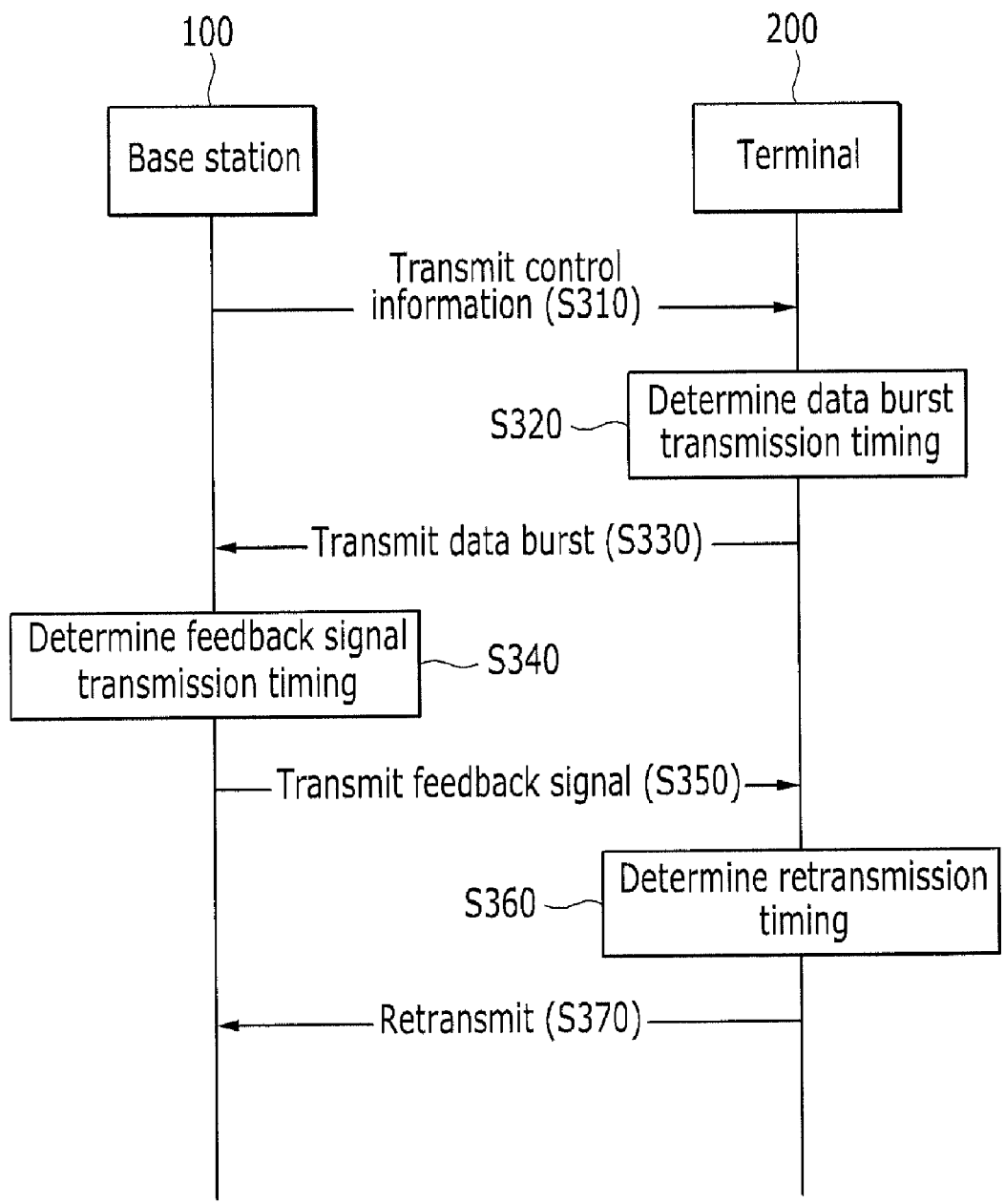
FIG. 3 is a flowchart schematically showing an uplink HARQ operation according to one exemplary embodiment of the present invention.
Figure 4:
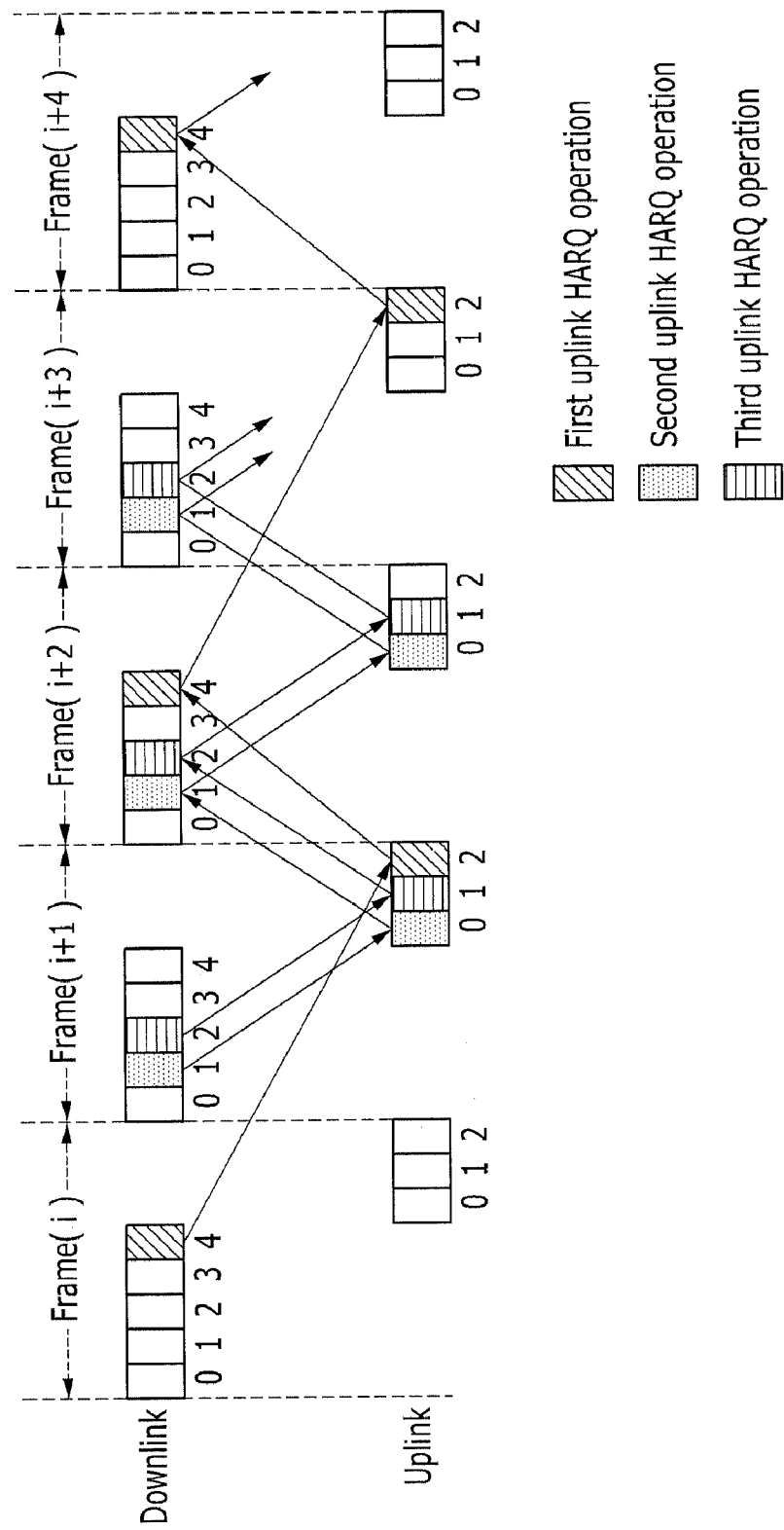
FIG. 4 is a view showing an uplink HARQ transmission timing according to one exemplary embodiment of the present invention.

FIG. 3 is a flowchart schematically showing an uplink HARQ operation according to one exemplary embodiment of the present invention. FIG. 4 is a view showing an uplink HARQ transmission timing according to one exemplary embodiment of the present invention.

First, referring to FIG. 3, the base station 100 transmits control information in a downlink subframe I of the frame i (S310).

The terminal 200 having received the control information determines indices j and m of a frame and uplink subframe corresponding to a transmitting timing of a data burst (S320), and transmits the data burst to the base station 100 (S330). The indices j and m of the frame and uplink subframe corresponding to the timing at which the terminal 200 transmits the data burst are obtained by Equations 5 to 7, and obtains a reference timing parameter K as in Equation 2. v is a packet transmission frame offset. If the packet transmission frame offset v is 0, a fast transmission for transmitting the data burst in the same frame as the frame i in which the control information has been transmitted, and if the packet transmission frame offset v is 1, a slow transmission for transmitting the data burst in the next frame i+1 is performed.

$$m = \begin{cases} 0, & \text{for } 0 \le l < K \\ l - K, & \text{for } K \le l < U + K \\ U - 1, & \text{for } U + K \le l < D \end{cases} \quad \text{(Equation 5)}$$

$$j = (i + v) \bmod N \quad \text{(Equation 6)}$$

$$v = \begin{cases} 0, & \text{if } ((D - l - 1 + m) \ge T_{proc}) \\ 1, & \text{else} \end{cases} \quad \text{(Equation 7)}$$

Next, the base station 100 having received the data burst determines a transmitting timing of a feedback signal including an ACK or NACK message (S340), and transmits the feedback signal to the terminal 200 (S350). The index k of the frame in which the base station 100 transmits the feedback signal can be obtained by using Equations 8 and 9, and a downlink subframe index can be determined to be identical to the index I of the subframe in which the control information has been transmitted. w is the feedback frame offset used in the uplink HARQ transmission, and has a value of 0 or 1.

$$k = (j + 1 + w) \bmod N \quad \text{(Equation 8)}$$

$$w = \begin{cases} 0, & \text{if } ((U - m - N_{TTI} + l) \ge T_{proc}) \\ 1, & \text{else} \end{cases} \quad \text{(Equation 9)}$$

If the feedback signal received by the terminal 200 is an NACK message, the terminal 200 determines a retransmission timing (S360), and retransmits the data burst to the base station 100 (S370). The terminal 200 obtains the index p of a frame to be retransmitted by using Equation 10. At this point, the packet transmission frame offset v is obtained as in Equation 7. An uplink subframe index to be retransmitted is determined to be identical to the uplink subframe m previously used for data burst transmission.

$$p = (k + v) \bmod N \quad \text{(Equation 10)}$$

Referring to FIG. 4, regarding the first uplink HARQ operation in which the base station 100 transmits control information in the downlink subframe 4 of the frame i in the TDD mode, the terminal 200 having received the control information transmits a data burst in the uplink subframe 2 of the frame i+1 determined by using Equations 5 to 7. The base station 100 having received the data burst occupies the same downlink subframe 4 as previously used for transmitting the control information in the frame i+2 determined by Equation 8 and Equation 9, and transmits a feedback signal. The terminal 200 having received an NACK message repeats the HARQ operation for retransmission in the subframe 2 at the same position as the uplink subframe in which the data burst has been previously transmitted, in a frame i+3 determined by using Equation 10.

When the base station 100 performs the second and third uplink HARQ operations for transmitting control information in the downlink subframe 1 and downlink subframe 2 of the frame i+1, respectively, the terminal 200 transmits a data burst in the uplink subframe 0 of the frame i+1 determined by using Equations 5 to 7 to perform the second HARQ uplink operation. The base station 100 having received the data burst transmits a feedback signal in the downlink subframe 1 of the frame i+2 determined by using Equations 8 and 9, and the terminal 200 having received an NACK message retransmits the data burst in the uplink subframe 0 of the frame i+2. Likewise, the third uplink HARQ operation is performed by occupying the uplink subframe 1 of the frame i+1, the downlink subframe 2 of the frame i+2, and an uplink subframe 1 of the frame i+2.

When the HARQ operation is performed in this manner, there may occur a phenomenon that the terminal 200 transmits a data burst allocated later with resources to the base station 100 earlier than a data burst allocated earlier with resources. This is because the second and third uplink HARQ operations in which the packet transmission frame offset v used to determine the frame index is 0 performs a fast transmission, while the first HARQ operation in which the packet transmission frame offset v is 1 performs a slow transmission.

Next, a transmission timing determination method for a fast HARQ operation will be described.

Figure 5:
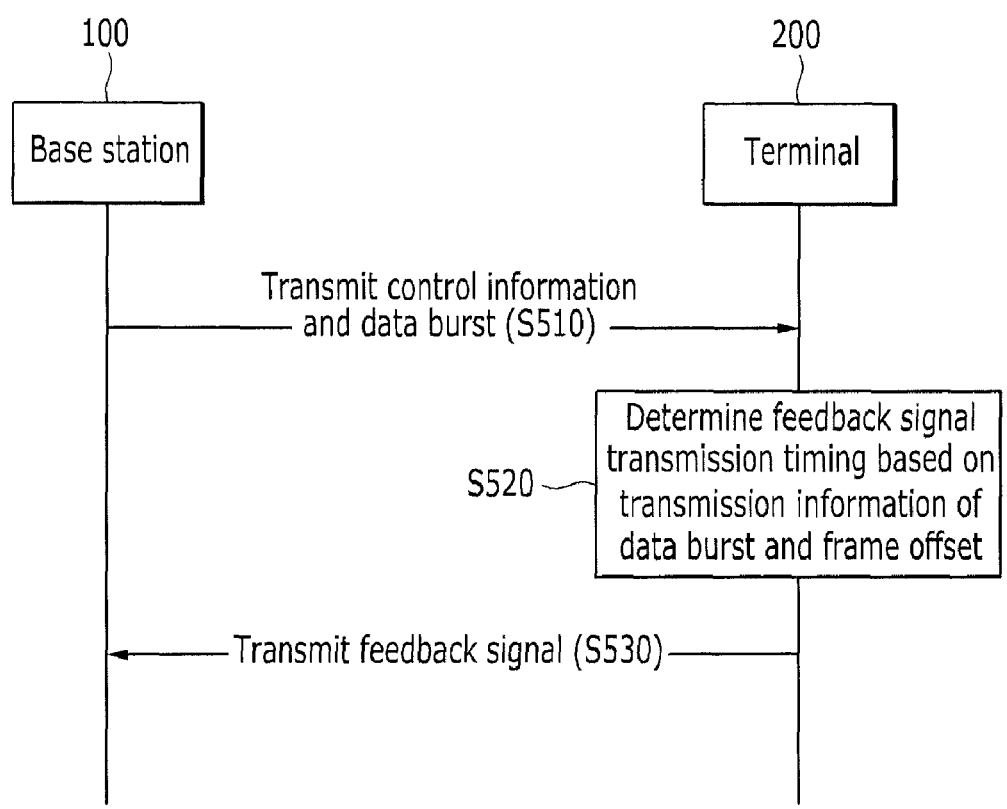
FIG. 5 is a flowchart schematically showing a downlink HARQ operation according to another exemplary embodiment of the present invention.
Figure 6:
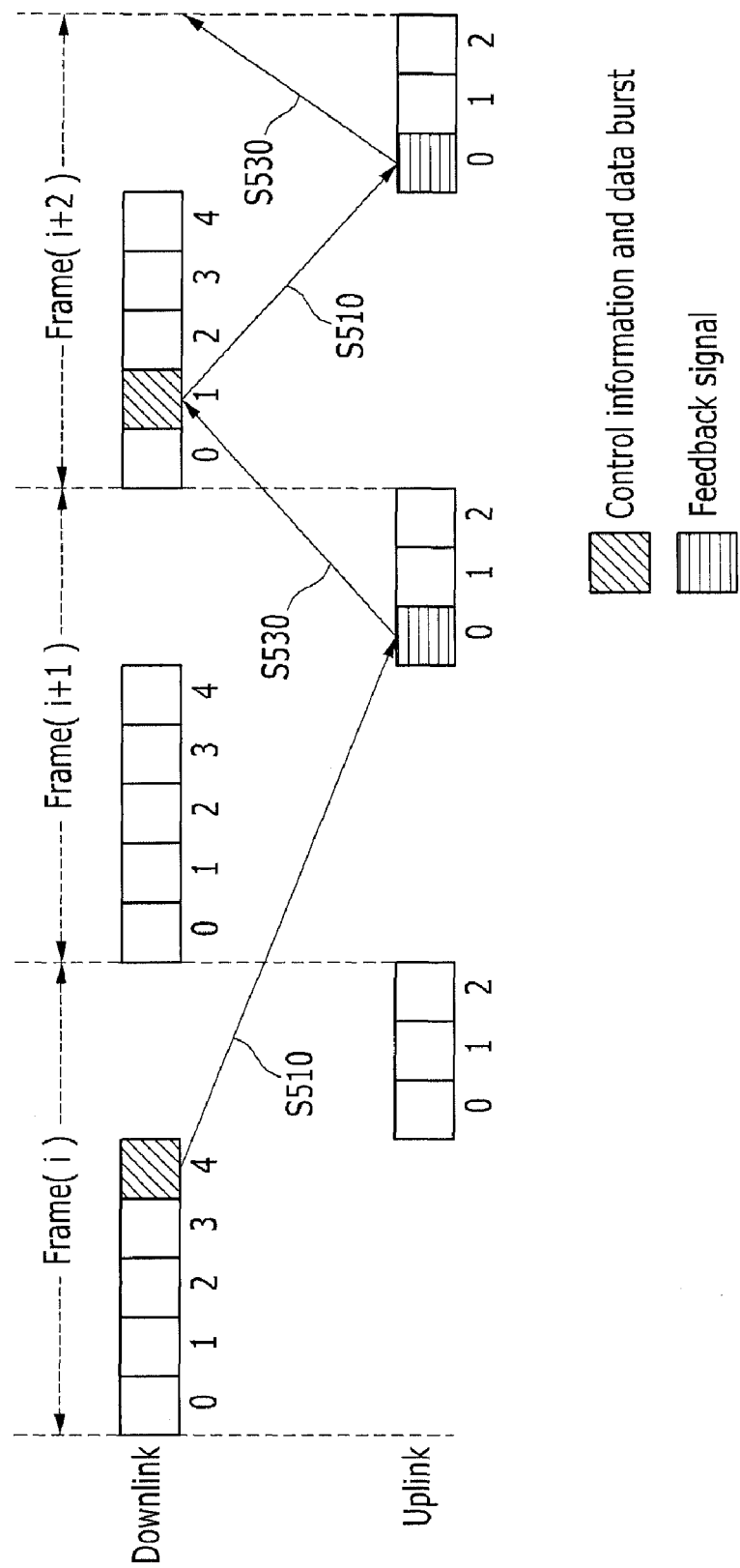
FIGS. 6 and 7 are views showing a downlink HARQ transmission timing according to another exemplary embodiment of the present invention.
Figure 7:
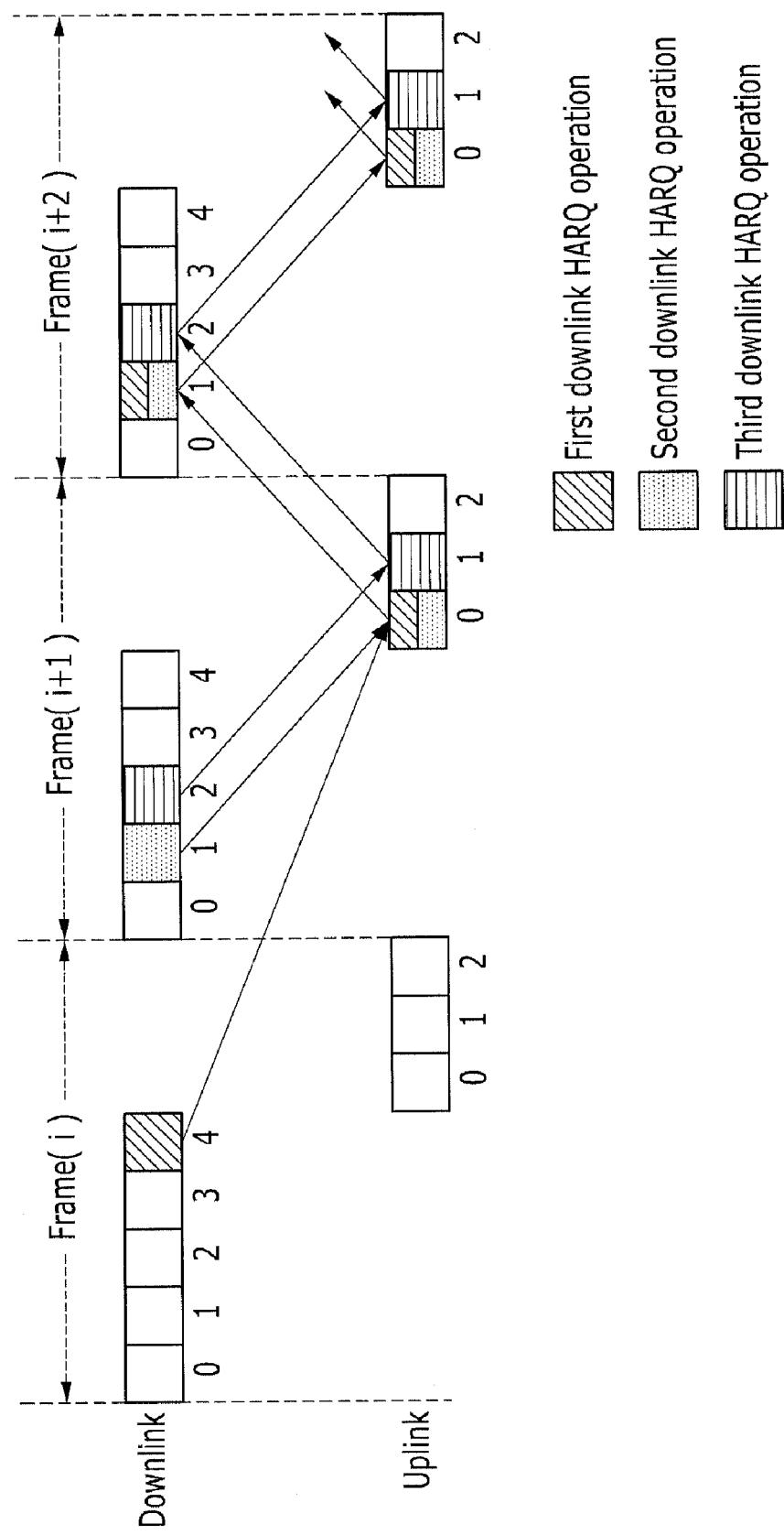

FIG. 5 is a flowchart schematically showing a downlink HARQ operation according to another exemplary embodiment of the present invention. FIGS. 6 and 7 are views showing a downlink HARQ transmission timing according to another exemplary embodiment of the present invention.

First, referring to FIG. 5, a base station 100 transmits control information including resource allocation information and a data burst in a downlink subframe m' of a frame i' (S510).

A terminal 200 having received the control information and the data burst determines indices j' and n' of a frame and uplink subframe for transmitting a feedback signal based on a feedback frame offset z' (S520). The indices j' and n' of the frame and uplink subframe can be obtained as in Equations 11 to 13.

$$j' = (i' + z') \bmod N \quad \text{(Equation 11)}$$

For $0 \le m' < U + K$, (Equation 12)
$z' = 0$
For $U + K \le m' < D$,
$$z' = \begin{cases} 0, & \text{if } ((D - m' - N_{TTI} + U - 1) \ge T_{proc}) \\ 1, & \text{else} \end{cases}$$

$$n' = \begin{cases} 0, & \text{for } 0 \le m' < K \\ m' - K, & \text{for } K \le m' < U + K \\ 0, \text{ or } U - 1, & \text{for } U + K \le m' < D \end{cases} \quad \text{(Equation 13)}$$

A method for determining the indices j' and n' of the frame and uplink subframe for transmitting a feedback signal will be described in detail. First, the terminal 200 obtains a reference timing parameter K for determining a transmission timing based on the size of the number D of downlink subframes and the number U of uplink subframes as shown in Equation 2. If the index m' of the downlink subframe in which the data burst has been transmitted is less than the reference timing parameter K, the terminal 200 determines to transmit a feedback signal in an uplink subframe 0 of the same frame as the frame i' in which the data burst has been transmitted. If the index m' of the downlink subframe in which the data burst has been transmitted is greater than or equal to the reference timing parameter K and less than the sum of the number D of downlink subframes D and the number U of uplink subframes, the terminal 200 determines to transmit a feedback signal in an uplink subframe m'−K of the same frame as the frame i' in which the data burst has been transmitted. If the index m' of the downlink subframe in which the data burst has been transmitted is greater than or equal to the sum of the reference timing parameter K and the number U of uplink subframes and less than the number D of downlink subframes, the terminal 200 determines to transmit a feedback signal in the same frame as the frame i' in which the data burst has been transmitted or in the next frame i'+1 based on the feedback frame offset z'. If the feedback frame offset z' is 0, it is determined that a feedback signal is transmitted in an uplink subframe U−1, whereas, if the feedback frame offset z' is 1, it is determined that a feedback signal is transmitted in the uplink subframe 0.

The terminal 200 transmits a feedback signal at a transmission timing determined in this manner (S530).

A downlink HARQ transmission timing using Equations 11 to 13 is given in Table 1.

TABLE 1

| content | subframe index | frame index |
|---|---|---|
| Control information transmission | 1 | i' |
| data burst transmission | m' = 1 | i' |
| Feedback transmission | $n' = \begin{cases} 0, & \text{for } 0 \le m' < K \\ m' - K, & \text{for } K \le m' < U + K \\ 0, \text{ or } U - 1, & \text{for } U + K \le m' < D \end{cases}$ | $j' = (i' + z') \bmod N$ Where For $0 \le m' < U + K$, $z' = 0$ For $U + K \le m' < D$, $z' = \begin{cases} 0, & \text{if } (D - m' - N_{TTI} + U - 1) \ge T \\ 1, & \text{else} \end{cases}$ |

Next, referring to FIGS. 5 and 6, the base station 100 transmits control information and a data burst in a downlink subframe 4 of a frame i (S510). As previously assumed, the transmission is performed under the assumption that downlink subframes and uplink subframes are divided at a ratio of 5:3, the data burst occupies one subframe (i.e., $N_{TTI}=1$) using a default TTI transmission, and the processing time required to process the data burst is 3 (i.e., $T_{proc}=3$).

The terminal 200 having received the data burst determines a transmission timing using Equations 11 to 13. As the feedback frame offset z' is 1, a feedback signal is transmitted in an uplink subframe 0 of a frame i+1 (S530). If the base station 100 receives an NACK message, the base station 100 can arbitrarily determine a retransmission timing. For example, when the base station 100 retransmits in a downlink subframe 1 of the frame i+1 (S510), the terminal 200 can transmit a feedback signal in an uplink subframe 0 of a frame i+2 determined by using Equations 11 to 13 (S530).

In this manner, if the feedback frame offset z' is 1, the terminal 200 transmits a feedback signal for the data burst transmitted in the downlink subframe 4 in the uplink subframe 0 instead of an uplink subframe 2, thereby transmitting a feedback signal at a timing faster by a (U−1) subframe than the HARQ operation described with reference to FIG. 2.

Referring to FIG. 7, subsequent to the first downlink HARQ operation explained in FIG. 6, the terminal 200 receives the control information and data burst transmitted using the downlink subframe 1 and downlink subframe 2 of the frame i+1, respectively, from the base station 100, and performs the second and third downlink HARQ operations. At this point, in the second and third downlink HARQ operations, even if a fast feedback procedure for transmitting a feedback signal is performed using the same frame as the frame in which the data burst has been transmitted, the terminal 200 transmits a feedback signal at a time not earlier than the first downlink HARQ operation explained with reference to FIG. 6

Figure 8:
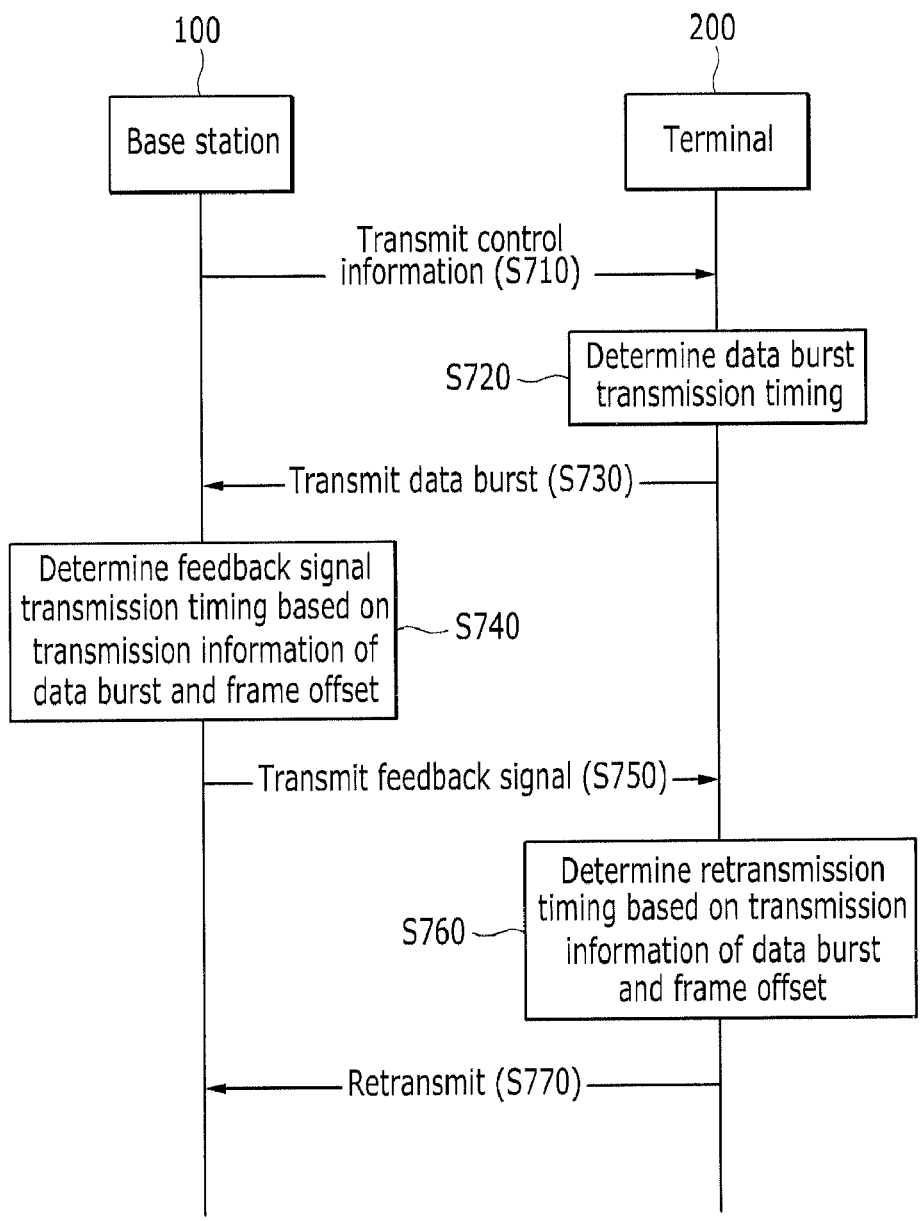
FIG. 8 is a flowchart schematically showing an uplink HARQ operation according to another exemplary embodiment of the present invention.
Figure 9:
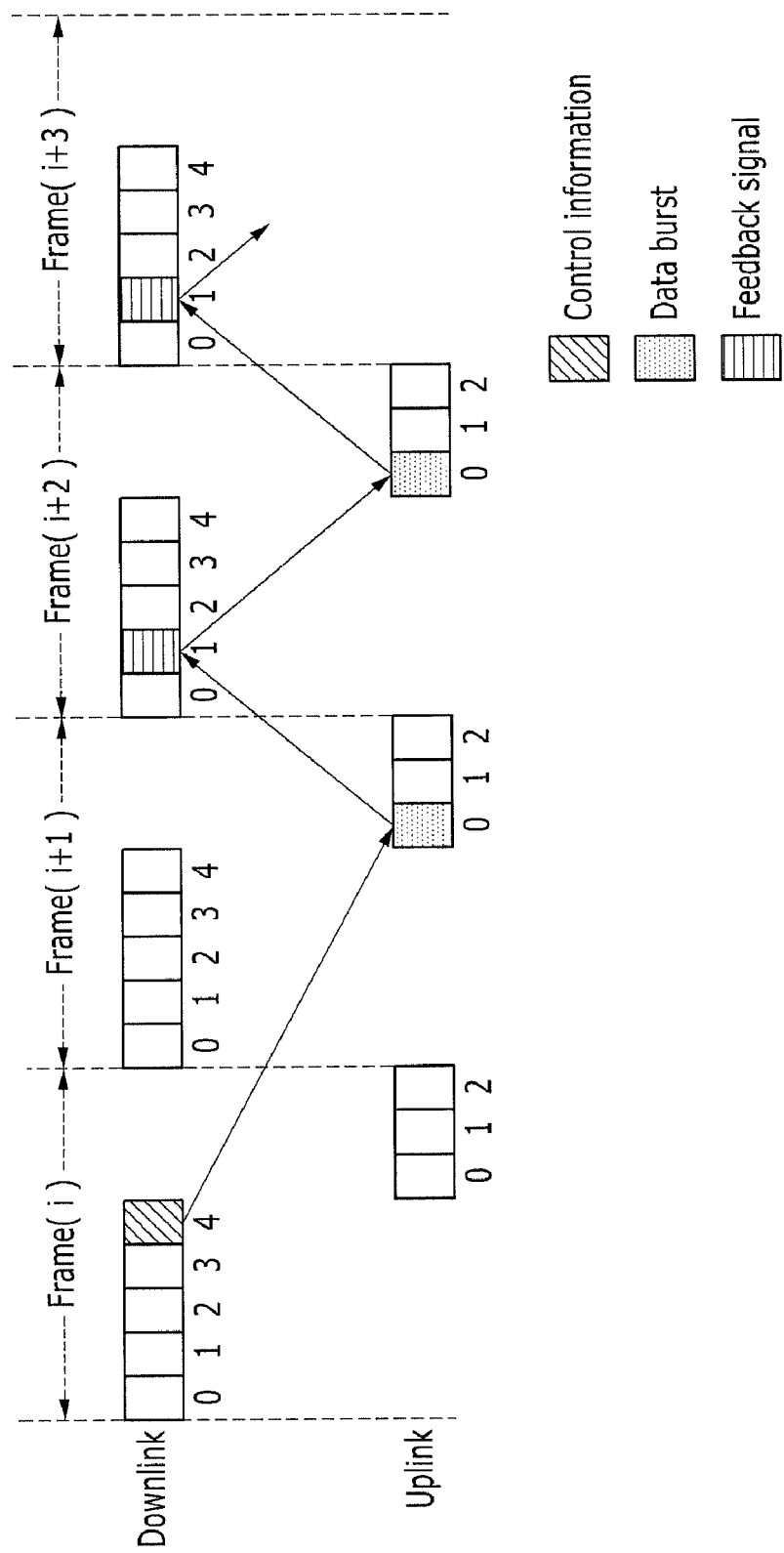
FIGS. 9 and 10 are views showing an uplink HARQ transmission timing according to another exemplary embodiment of the present invention.
Figure 10:
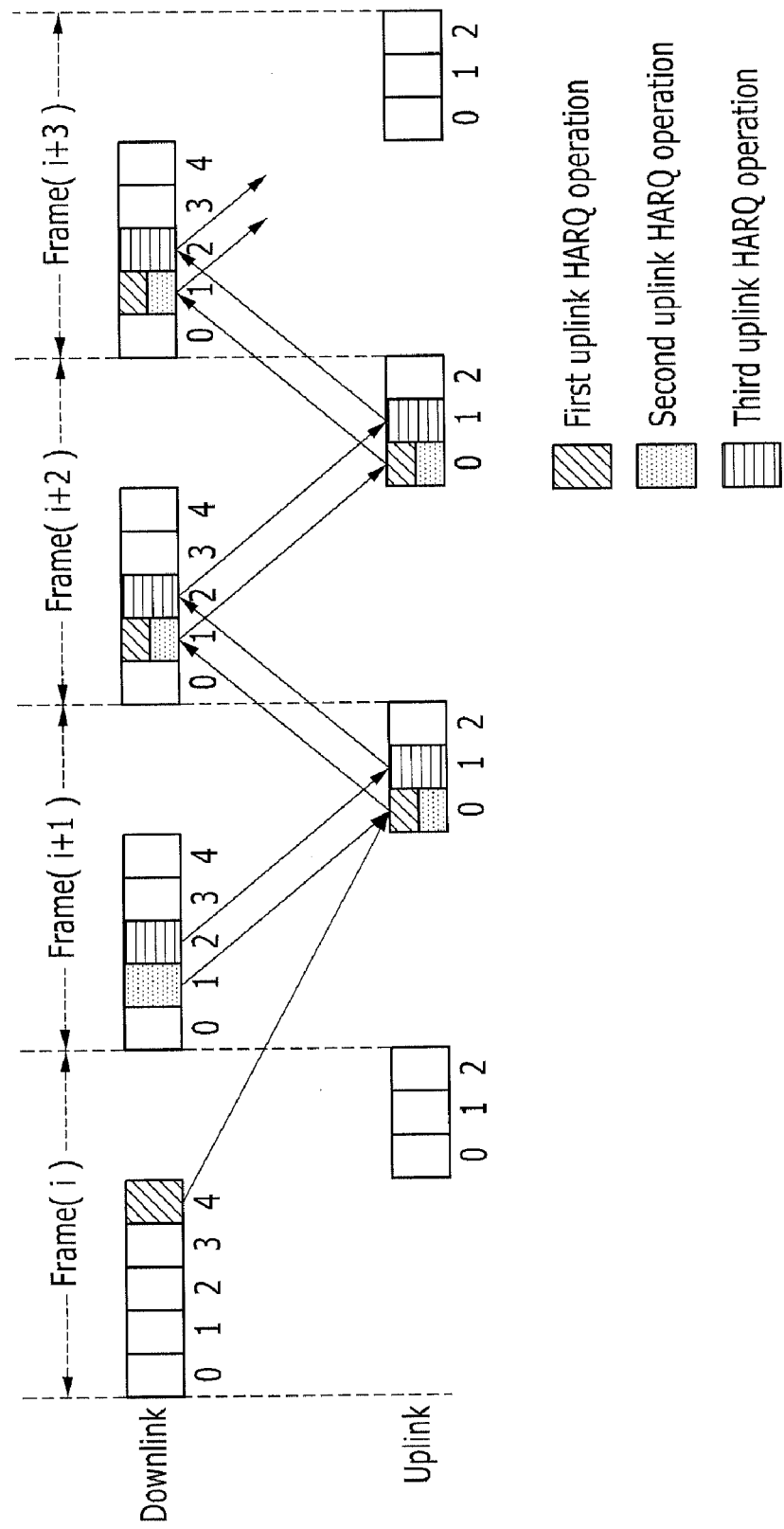

FIG. 8 is a flowchart schematically showing an uplink HARQ operation according to another exemplary embodiment of the present invention. FIGS. 9 and 10 are views showing an uplink HARQ transmission timing according to another exemplary embodiment of the present invention.

First, referring to FIG. 8, a base station 100 transmits control information including resource allocation information in a subframe l' of a frame i' (S810).

A terminal 200 having received the control information determines indices j' and m' of a frame and uplink subframe for transmitting a data burst based on a packet transmission frame offset v' (S820). The indices j' and m' of the frame and uplink subframe can be obtained as in Equations 14 to 16. v' is a packet transmission frame offset.

$$j' = (i' + v') \bmod N \quad \text{(Equation 14)}$$

For $0 \le l' < U + K$, (Equation 15)
$v' = 0$
For $U + K \le l' < D$,
$v' = \begin{cases} 0, & \text{if } (D - l' - U - 2) \ge T_{proc} \\ 1, & \text{else} \end{cases}$ $$m' = \begin{cases} 0, & \text{for } 0 \le l' < K \\ l' - K, & \text{for } K \le l' < U + K \\ 0, \text{ or } U - 1, & \text{for } U + K \le l' < D \end{cases} \quad \text{(Equation 16)}$$

A method for determining the indices i' and m' of the frame and uplink subframe for transmitting a data burst will be described in detail. First, the terminal 200 obtains a reference timing parameter K for determining a transmission timing based on the size of the number D of downlink subframes and the number U of uplink subframes as shown in Equation 2. If the index l' of the downlink subframe in which the control information has been transmitted is less than the reference timing parameter K, the terminal 200 determines to transmit a data burst in an uplink subframe 0 of the same frame as the frame i' in which the control information has been transmitted. If the index l' of the downlink subframe in which the control information has been transmitted is greater than or equal to the reference timing parameter K and less than the sum of the number D of downlink subframes D and the number U of uplink subframes, the terminal 200 determines to transmit a data burst in an uplink subframe l'-K of the same frame as the frame i' in which the control information has been transmitted. If the index l' of the downlink subframe in which the control information has been transmitted is greater than or equal to the sum of the reference timing parameter K and the number U of uplink subframes and less than the number D of downlink subframes, the terminal 200 determines to transmit a data burst in the same frame as the frame i' in which the control information has been transmitted or in the next frame i'+1 based on the packet transmission frame offset v'. If the packet transmission frame offset v' is 0, which corresponds to fast transmission, it is determined that a data burst is transmitted in an uplink subframe U−1, whereas, if the packet transmission frame offset v' is 1, which corresponds to slow transmission, it is determined that a data burst is transmitted in the uplink subframe 0.

The terminal 200 transmits a data burst at a transmission timing determined in this manner (S830).

frame index to be retransmitted is determined to be identical to the uplink subframe m previously used for data burst transmission.

$$p' = (k' + u) \bmod N \qquad \text{(Equation 20)}$$

$$u = \begin{cases} 0, & \text{if } ((D - l' - 1 - m') \geq T_{proc} \\ 1, & \text{else} \end{cases} \qquad \text{(Equation 21)}$$

An uplink HARQ transmission timing using Equations 14 to 21 is given in Table 2.

TABLE 2

| content | subframe index | frame index |
|---|---|---|
| Control information transmission | l' | i' |
| Data burst transmission | $m' = \begin{cases} 0, & \text{for } 0 \leq l' < K \\ l' - K, & \text{for } K \leq l' < U + K \\ 0, \text{ or } U - 1, & \text{for } U + K \leq l' < D \end{cases}$ | $j' = (i' + v') \bmod N$ Where For $0 \leq l' < U + K$, $v' = 0$ For $U + K \leq l' < D$, $v' = \begin{cases} 0, & \text{if } (D - l' - U - 2) \geq T_{proc} \\ 1, & \text{else} \end{cases}$ |
| feedback transmission | n' = m' − K | $k' = (j' + 1 + w') \bmod N$ Where $w' = \begin{cases} 0, & \text{if } (U - m' - N_{TTI} + l') \geq T_{proc}) \\ 1, & \text{else} \end{cases}$ |
| retransmission | m' | $p' = (k' + u) \bmod N$ Where $u = \begin{cases} 0, & \text{if } (D - l' - 1 - m') \geq T_{proc} \\ 1, & \text{else} \end{cases}$ |

Next, the base station 100 having received the data burst determines a transmitting timing of a feedback signal including an ACK or NACK message using the reference timing parameter K (S840). The base station 100 obtains indices k' and n' of a frame and uplink subframe for transmitting a feedback signal as in Equations 17 to 19. w' is the feedback frame offset used in the uplink HARQ transmission, and has a value of 0 or 1.

$$k' = (j' + 1 + w') \bmod N \qquad \text{(Equation 17)}$$

$$w' = \begin{cases} 0, & \text{if } ((U - m' - N_{TTI} + l') \geq T_{proc}) \\ 1, & \text{else} \end{cases} \qquad \text{(Equation 18)}$$

$$n' = m' - K \qquad \text{(Equation 19)}$$

The base station 100 transmits a feedback signal at a transmission timing determined in this manner (S850).

If the feedback signal received by the terminal 200 is an NACK message, the terminal 200 determines a retransmission timing (S860), and retransmits the data burst to the base station 100 (S870). The terminal 200 obtains the index p' of a frame to be retransmitted by using Equations 20 and 21. At this point, u is a packet retransmission frame offset for determining the index of a retransmission frame. An uplink sub- Next, referring to FIGS. 8 and 9, the base station 100 transmits control information in a downlink subframe 4 of a frame i (S810). As previously assumed, the transmission is performed under the assumption that downlink subframes and uplink subframes are divided at a ratio of 5:3, the data burst occupies one subframe (i.e., $N_{TTI}$=1) using a default TTI transmission, and the processing time required to process the data burst is 3 (i.e., $T_{proc}$=3).

The terminal 200 having received the control information determines a transmission timing of a data burst using Equations 14 to 16. As the packet transmission frame offset v' is 1, a data burst is transmitted in an uplink subframe 0 of a frame i+1 (S830). The base station 200 having received the data burst transmits a feedback signal in a downlink subframe 1 of the frame i+1 determined by using Equations 17 to 19 (S850).

If the terminal 200 receives an NACK message, the terminal 200 retransmits the data burst in the position of the subframe 0, in which the data burst has been previously transmitted, in a frame i+2 determined by using Equations 20 and 21 (S870).

Referring to FIG. 10, subsequent to the first uplink HARQ operation explained in FIG. 9, the terminal 200 receives the control information and data burst transmitted using the downlink subframe 1 and downlink subframe 2 of the frame i+1, respectively, from the base station 100, and performs the second and third uplink HARQ operations. First of all, regarding the second uplink HARQ operation, the terminal 200 performs fast transmission for transmitting a data burst in the uplink subframe 0 of the frame i+1 determined by using Equations 14 to 16. Then, the base station 100 having received the data burst transmits a feedback signal in a downlink subframe 1 of the frame i+2 determined by using Equations 17 to 19. If the terminal 200 receives an NACK message, the data burst is retransmitted in an uplink subframe 0 of the frame i+2 determined by using Equations 20 and 21. Next, the third uplink HARQ operation is performed by occupying an uplink subframe 1 of the frame i+1, a downlink subframe 2 of the frame i+2, and an uplink subframe 1 of the frame i+2.

In this manner, even if fast transmission is performed for receiving the control information transmitted in the frame i+1 and transmitting a data burst in the frame i+1, the data burst is transmitted not earlier than slow transmission for receiving the control information transmitted in the frame i and transmitting a data burst in the next frame i+1.

Next, a retransmission apparatus performing the retransmission method according to one exemplary embodiment of the present invention will be described with reference to FIG. 11.

Figure 11:
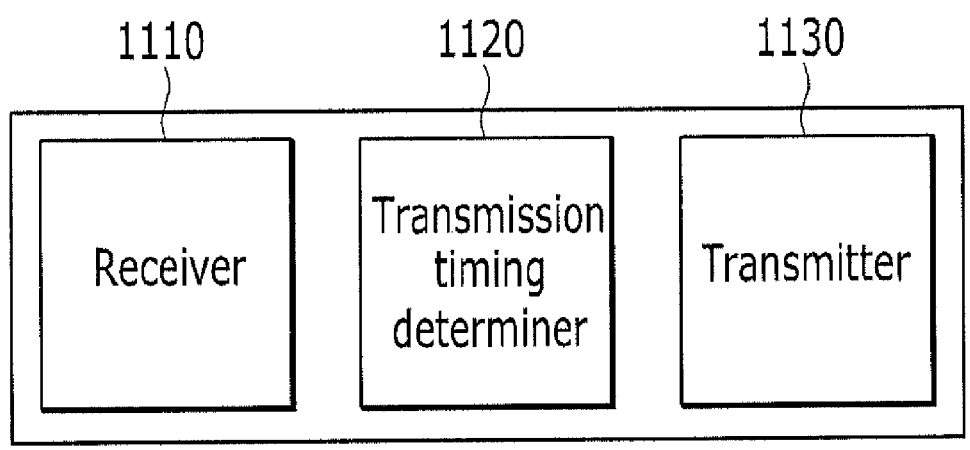
FIG. 11 is a schematic block diagram of a retransmission apparatus according to one exemplary embodiment of the present invention.

FIG. 11 is a schematic block diagram of a retransmission apparatus according to one exemplary embodiment of the present invention.

Referring to FIG. 11, the retransmission apparatus comprises a receiver 1100, a transmission timing determiner 1120, and a transmitter 1130. The retransmission apparatus may be formed in a terminal or base station.

If the retransmission apparatus is formed in the terminal, the receiver 1110 receives a data burst from the base station, and the transmission timing determiner 1120 determines the indices of a frame and uplink subframe for transmitting a feedback signal as explained above. Then, the transmitter 1130 transmits a feedback signal to the base station in the determined frame index and uplink subframe index. Alternatively, the transmitter 1130 transmits a data burst to the base station, and the receiver 1110 receives a feedback signal for the transmitted data burst to the base station from the base station. If the receiver 1110 receives a feedback signal including an NACK message, the transmission timing determiner 1120 determines a retransmission timing. Then, the transmitter 1130 retransmits the data burst to the base station at the determined retransmission timing.

If the retransmission apparatus is formed in the base station, the receiver 1110 receives a data burst from the terminal, and the transmission timing determiner 1120 determines the indices of a frame and downlink subframe for transmitting a feedback signal as explained above. Then, the transmitter 1130 transmits a feedback signal to the terminal in the determined frame index and downlink subframe index. Alternatively, the transmitter 1130 transmits a data burst to the terminal, and the receiver 1110 receives a feedback signal for the transmitted data burst to the terminal. If the receiver 1110 receives a feedback signal including an NACK message from the terminal, the transmission timing determiner 1120 determines a retransmission timing, and the transmitter 1130 retransmits the data burst at the determined retransmission timing.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a terminal conducts an operation for retransmission using a frame divided into downlink subframes and uplink subframes, the method comprising:
   receiving a data burst transmitted from a base station;
   determining a feedback frame offset according to the range of a downlink subframe index in which the data burst has been transmitted, from among ranges set based on division information of the frame;
   determining a transmission timing of a feedback signal based on the feedback frame offset;
   transmitting the feedback signal to the base station at the determined timing; and
   if an NACK message is included in the feedback signal, receiving the data burst retransmitted from the base station.

2. The method of claim 1, wherein the determining of the feedback frame offset comprises:
   obtaining a reference timing parameter calculated based on the size of the number of the divided downlink subframes and the number of the divided uplink subframes;
   obtaining the range of a downlink subframe index in which the data burst has been transmitted from among a first range where the downlink subframe index is less than the reference timing parameter, a second range where the downlink subframe index is greater than the reference timing parameter and less than the sum of the number of the uplink subframes and the reference timing parameter, and a third range where the downlink subframe index is greater than the sum of the number of the uplink subframes and the reference timing parameter and less than the number of the downlink subframes;
   if the downlink subframe index in which the data burst has been transmitted is in the first range or the second range, determining the feedback frame offset as 0; and
   if the downlink subframe index in which the data burst has been transmitted is in the third range, determining the feedback frame offset as 0 or 1 by comparing a value determined by transmission information of the data burst with the processing time required to process the data burst.

3. The method of claim 2, wherein, if the number of the downlink subframes is greater than or equal to the number of the uplink subframes, the reference timing parameter is determined as floor((D−U)/2), and if the number of the downlink subframes is less than the number of the uplink subframes, the reference timing parameter is determined as −ceil((U−D)/2), and D and U denote the number of the downlink subframes and the number of the uplink subframes, respectively.

4. The method of claim 2, wherein the transmission information of the data burst comprises the downlink subframe index in which the data burst has been transmitted and the number of subframes occupied by the data burst.

5. The method of claim 4, wherein the value determined by the transmission information of the data burst is determined as $D-m'-N_{TTI}+U-1$, and D denotes the number of the downlink subframes, U denotes the number of the uplink subframes, m' denotes the downlink subframe index in which the data burst has been transmitted, and $N_{TTI}$ denotes the number of subframes occupied by the data burst.

6. The method of claim 2, wherein the determining of the transmission timing comprises determining a frame index so that, if the feedback frame offset is 0, the feedback signal is transmitted in the same frame as the frame in which the data burst has been transmitted, and if the feedback frame offset is 1, the feedback signal is transmitted in a frame next to the frame in which the data burst has been transmitted.

7. The method of claim 6, wherein the determining of the transmission timing further comprises:
- if the feedback frame offset is 0, determining an uplink subframe index so that the feedback signal is transmitted in any one of the uplink subframes included in the determined frame index; and
- if the feedback frame offset is 1, determining an uplink subframe index so that the feedback signal is transmitted in the first uplink subframe included in the determined frame index.

8. The method of claim 7, wherein the determining of the uplink subframe index when the feedback frame offset is 0 comprises, if the downlink subframe index in which the data burst has been transmitted is in the first range, determining the uplink subframe index as 0, if the downlink subframe index in which the data burst has been transmitted is in the second range, determining the uplink subframe index as a difference value between the downlink subframe index in which the data burst has been transmitted and the reference timing parameter, and if the downlink subframe index in which the data burst has been transmitted is in the second range, determining the uplink subframe index as the last index of the uplink subframe.

9. A method in which a terminal retransmits using a frame divided into downlink subframes and uplink subframes, the method comprising:
- receiving control information from a base station;
- determining a packet transmission frame offset according to the range of a downlink subframe index in which the control information has been transmitted, from among ranges set based on division information of the frame;
- determining a transmission timing of a data burst based on the packet transmission frame offset and transmitting the data burst to the base station;
- receiving a feedback signal for the transmitted data burst from the base station; and
- if an NACK message is included in the feedback signal, determining a retransmission timing of the data burst and retransmitting the same to the base station.

10. The method of claim 9, wherein the determining of the packet transmission frame offset comprises:
- obtaining a reference timing parameter calculated based on the size of the number of the divided downlink subframes and the number of the divided uplink subframes;
- obtaining the range of a downlink subframe index in which the control information has been transmitted from among a first range where the downlink subframe index is less than the reference timing parameter, a second range where the downlink subframe index is greater than the reference timing parameter and less than the sum of the number of the uplink subframes and the reference timing parameter, and a third range where the downlink subframe index is greater than the sum of the number of the uplink subframes and the reference timing parameter and less than the number of the downlink subframes;
- if the downlink subframe index in which the control information has been transmitted is in the first range or the second range, determining the packet transmission frame offset as 0; and
- if the downlink subframe index in which the control information has been transmitted is in the third range, determining the packet transmission frame offset as 0 or 1 based on a value determined by the time required to process the data burst.

11. The method of claim 10, wherein the transmitting of the data burst comprises:
- determining a frame index so that, if the packet transmission frame offset is 0, the feedback signal is transmitted in the same frame as the frame in which the control information has been transmitted, and if the packet transmission frame offset is 1, the feedback signal is transmitted in a frame next to the frame in which the control information has been transmitted;
- if the packet transmission frame offset is 0, determining an uplink subframe index so that the data burst is transmitted in any one of the uplink subframes included in the determined frame index; and
- if the packet transmission frame offset is 1, determining an uplink subframe index so that the data burst is transmitted in the first uplink subframe included in the determined frame index; and
- transmitting the data burst in the determined indices of the frame and uplink subframe.

12. The method of claim 11, wherein the determining of the uplink subframe index when the packet transmission frame offset is 0 comprises, if the downlink subframe index in which the control information has been transmitted is in the first range, determining the uplink subframe index as 0, if the downlink subframe index in which the control information has been transmitted is in the second range, determining the uplink subframe index as a difference value between the downlink subframe index in which the data burst has been transmitted and the reference timing parameter, and if the downlink subframe index in which the data burst has been transmitted is in the second range, determining the uplink subframe index as the last index of the uplink subframe.

13. The method of claim 9, wherein the retransmitting to the base station comprises:
- determining the index of the uplink subframe in which the data burst has been transmitted the base station as the uplink subframe index to be retransmitted;
- determining the frame index to be retransmitted by comparing a value determined by the downlink subframe index in which control information has been transmitted and the uplink subframe index in which the data burst has been transmitted with the processing time required to process the data burst; and
- retransmitting the data burst in the determined indices of the frame and uplink subframe.

14. A method in which a terminal conducts an operation for retransmission using a frame divided into downlink subframes and uplink subframes, the method comprising:
- transmitting control information to a terminal;
- receiving a data burst transmitted according to the control information from the terminal;
- obtaining a reference timing parameter calculated based on the size of the number of the divided downlink subframes and the number of the divided uplink subframes;
- determining an index of a downlink subframe for transmitting a feedback signal based on an uplink subframe index in which the data burst has been transmitted;
- determining a frame index for transmitting the feedback signal based on a timing spaced apart by a feedback frame offset from the frame index in which the data burst has been transmitted;
- transmitting the feedback signal to the terminal in the determined indices of the frame and downlink subframe; and
- if an NACK message is included in the feedback signal, receiving the data burst retransmitted from the terminal.

15. The method of claim 14, wherein, in the determining of the index of the downlink subframe, the index of the downlink subframe is determined as a difference value between the index of the uplink subframe in which the data burst has been transmitted and the reference timing parameter.

16. The method of claim 14, wherein the feedback frame offset is determined as 0 or 1 by comparing a value determined by the downlink subframe index in which the control information has been transmitted and the uplink subframe index in which the data burst has been transmitted with the processing time required to process the data burst.

17. The method of claim 16, wherein the value determined by the downlink subframe index in which the control information has been transmitted and the uplink subframe index in which the data burst has been transmitted is determined as $U-m'-N_{TTI}+l'$, and U denotes the number of the uplink subframes, m' denotes the uplink subframe index in which the data burst has been transmitted, $N_{TTI}$ denotes the number of subframes occupied by the data burst, and l' denotes the downlink subframe index in which the control information has been transmitted.

18. A retransmission apparatus, as a retransmitting device of a terminal, comprising:
a receiver for receiving any one of control information, a first data burst, and a feedback signal for a second data burst transmitted to a base station;
a transmitter for transmitting a third data burst according to the received control information or a feedback signal for the received first data burst, or retransmitting the second data burst in response to the received feedback signal to the base station; and
a transmission timing determiner for determining a transmission timing of the third data burst, a transmission timing of the feedback signal for the first data burst, and a retransmission timing of the second data burst,
wherein, when transmitting the third data burst or the feedback signal in the next frame of the frame in which the control information or the first data burst has been transmitted, the transmission timing determiner determines to transmit the third data burst or the feedback signal in the first subframe included in the next frame.

19. The apparatus of claim 18, wherein the transmission timing determiner determines indices of a frame and uplink subframe index to be transmitted by setting ranges based on division information of a frame divided into downlink subframes and uplink subframes, and determining a feedback frame offset or a packet transmission frame offset according to the range of the downlink subframe index in which the control information or the first data burst has been transmitted among the set ranges.

* * * * *